(12) United States Patent
Tenma et al.

(10) Patent No.: US 11,563,330 B2
(45) Date of Patent: *Jan. 24, 2023

(54) ELECTRIC VEHICLE CONTROL DEVICE AND ELECTRIC VEHICLE

(71) Applicant: ISUZU MOTORS LIMITED, Tokyo (JP)

(72) Inventors: Yuuki Tenma, Fujisawa (JP); Kiyoshi Takeuchi, Chigasaki (JP); Shigeki Iijima, Yokohama (JP)

(73) Assignee: ISUZU MOTORS LIMITED, Tokyo (JP)

( * ) Notice: Subject to any disclaimer, the term of this patent is extended or adjusted under 35 U.S.C. 154(b) by 459 days.

This patent is subject to a terminal disclaimer.

(21) Appl. No.: 16/616,595

(22) PCT Filed: May 25, 2018

(86) PCT No.: PCT/JP2018/020093
§ 371 (c)(1),
(2) Date: Nov. 25, 2019

(87) PCT Pub. No.: WO2018/216791
PCT Pub. Date: Nov. 29, 2018

(65) Prior Publication Data
US 2020/0079230 A1  Mar. 12, 2020

(30) Foreign Application Priority Data
May 25, 2017  (JP) .............................. JP2017-103500

(51) Int. Cl.
*H02J 7/00* (2006.01)
*B60L 53/22* (2019.01)
(Continued)

(52) U.S. Cl.
CPC ............. *H02J 7/00* (2013.01); *B60L 15/2045* (2013.01); *B60L 50/51* (2019.02); *B60L 50/60* (2019.02);
(Continued)

(58) Field of Classification Search
CPC ........................................................ H02J 7/00
See application file for complete search history.

(56) References Cited

U.S. PATENT DOCUMENTS

| 9,758,050 B2* | 9/2017 | Yamamoto | .............. B60L 58/12 |
| 2013/0009764 A1* | 1/2013 | Yamamoto | .............. B60L 58/12 |
| | | | 340/455 |

(Continued)

FOREIGN PATENT DOCUMENTS

| JP | 2011-044346 A | 3/2011 |
| JP | 5200991 B2 | 2/2013 |

(Continued)

OTHER PUBLICATIONS

Machine translation of JP2016132263 (Year: 2016).*
(Continued)

*Primary Examiner* — Michael A Berns
(74) *Attorney, Agent, or Firm* — Brundidge & Stanger, P.C.

(57) ABSTRACT

This electric vehicle control device is provided with: an efficiency control unit which, during travel of the electric vehicle, in a state in which the battery is prone to deteriorate, increases the rate of consumption of the power charged in the battery by performing control for reducing the efficiency of the motor; a travelable distance calculation unit which calculates the travelable distance of the electric vehicle using the SOC of the battery and a travel coefficient; and a travel coefficient correction unit which, before and after the efficiency control unit performs control for reducing the (Continued)

efficiency of the motor, corrects the travel coefficient such that change in the travelable distance calculated by the travelable distance calculation unit is reduced.

6 Claims, 4 Drawing Sheets

(51) Int. Cl.
*B60L 50/60* (2019.01)
*B60L 50/51* (2019.01)
*B60L 15/20* (2006.01)

(52) U.S. Cl.
CPC .............. *B60L 50/66* (2019.02); *B60L 53/22* (2019.02); *B60L 2210/40* (2013.01)

(56) References Cited

U.S. PATENT DOCUMENTS

| | | | |
|---|---|---|---|
| 2020/0079230 A1* | 3/2020 | Tenma | ...................... H02J 7/00 |
| 2020/0180469 A1* | 6/2020 | Tenma | ................... B60L 58/13 |

FOREIGN PATENT DOCUMENTS

| | | | |
|---|---|---|---|
| JP | 2013158113 | * | 8/2013 |
| JP | 5453232 B2 | | 1/2014 |
| JP | 2015139346 A | | 7/2015 |
| JP | 2015171197 A | | 9/2015 |
| JP | 2016132263 | * | 7/2016 |
| JP | 2017-028874 A | | 2/2017 |

OTHER PUBLICATIONS

Machine translation of JP2013158113 (Year: 2013).*
International Search Report from International Application No. PCT/JP2018/020093 dated Aug. 21, 2018.

* cited by examiner

ELECTRIC VEHICLE CONTROL DEVICE AND ELECTRIC VEHICLE

TECHNICAL FIELD

The present disclosure relates to an electric vehicle control apparatus and electric vehicle.

BACKGROUND ART

To be able to reduce environmental pollution caused by vehicle emissions and deal with limited petroleum resources, there are attempts to use alternative power sources different from traditional internal combustion engines (hereinafter referred to as engines) as automotive power sources. A representative example of this is an electric vehicle. The electric vehicle drives a motor using electric power charged in a battery and uses a driving force of the motor as an automotive power source.

Such electric vehicles are roughly classified into pure electric vehicles that only use battery power as a power source and hybrid electric vehicles (HEV) that are equipped with an internal combustion engine and use power generated by the engine to charge a battery and/or drive the vehicle.

Incidentally, the batteries used for electric vehicles are reduced in capacity due to secular changes. The capacity reduction (hereinafter also referred to as deterioration) tends to progress when a state of charge (SOC) of the battery is within a predetermined range. In particular, there is a problem in that battery deterioration progresses relatively quickly when the SOC is in the predetermined range when the electric vehicle is running.

In connection with the above problem, a technique has been proposed that reduces efficiency of an electric motor and thereby increases a consumption rate of electric power charged in a battery, provided that the battery is currently in a SOC zone in which battery deterioration readily progresses when a vehicle is running (see, for example, Patent Literature (hereinafter abbreviated as PTL) 1).

CITATION LIST

Patent Literature

PTL 1
Japanese Patent No. 5200991

SUMMARY OF INVENTION

Technical Problem

However, when the consumption rate of the electric power charged in the battery is increased to reduce the time for which the SOC is in the predetermined range in which battery deterioration readily progresses as with the technique described in PTL 1, a decrease rate of the SOC increases, resulting in an increase in a decrease rate of a distance to empty based on the SOC. As a result, there is a problem in that a driver might misrecognize that there is something wrong with the electric vehicle. Even when the driver does not recognize that there is something wrong, a sudden change in the distance to empty might make the driver feel odd.

An object of the present disclosure is to provide an electric vehicle control apparatus and electric vehicle that can decrease the possibility that a driver will misrecognize that there is something wrong with the electric vehicle even when a consumption rate of electric power charged in a battery is increased when the electric vehicle is running.

Solution to Problem

An electric vehicle control apparatus according to the present disclosure is an apparatus that controls an electric vehicle equipped with a chargeable and dischargeable battery, an electric motor that drives a driving wheel by being supplied with electric power charged in the battery, and an inverter that converts DC power charged in the battery into AC power and applies the AC power to the motor, the electric vehicle control apparatus including:

an efficiency control section that performs control of reducing efficiency of the motor and thereby increases a consumption rate of the electric power charged in the battery, when the electric vehicle is running and the battery is in a state in which the battery is liable to deterioration;

a distance-to-empty calculation section that calculates a distance to empty for the electric vehicle using a state of charge (SOC) of the battery and a running factor; and a running factor correction section that corrects the running factor to reduce changes in the distance to empty calculated by the distance-to-empty calculation section when the changes are compared before and after the control of reducing the efficiency of the motor is performed by the efficiency control section.

An electric vehicle according to the present disclosure includes the electric vehicle control apparatus described above.

Advantageous Effect of Invention

The present disclosure makes it possible to decrease the possibility that a driver will misrecognize that there is something wrong with the electric vehicle even when a consumption rate of electric power charged in the battery is increased when the electric vehicle is running.

DESCRIPTION OF EMBODIMENT

Figure 1:
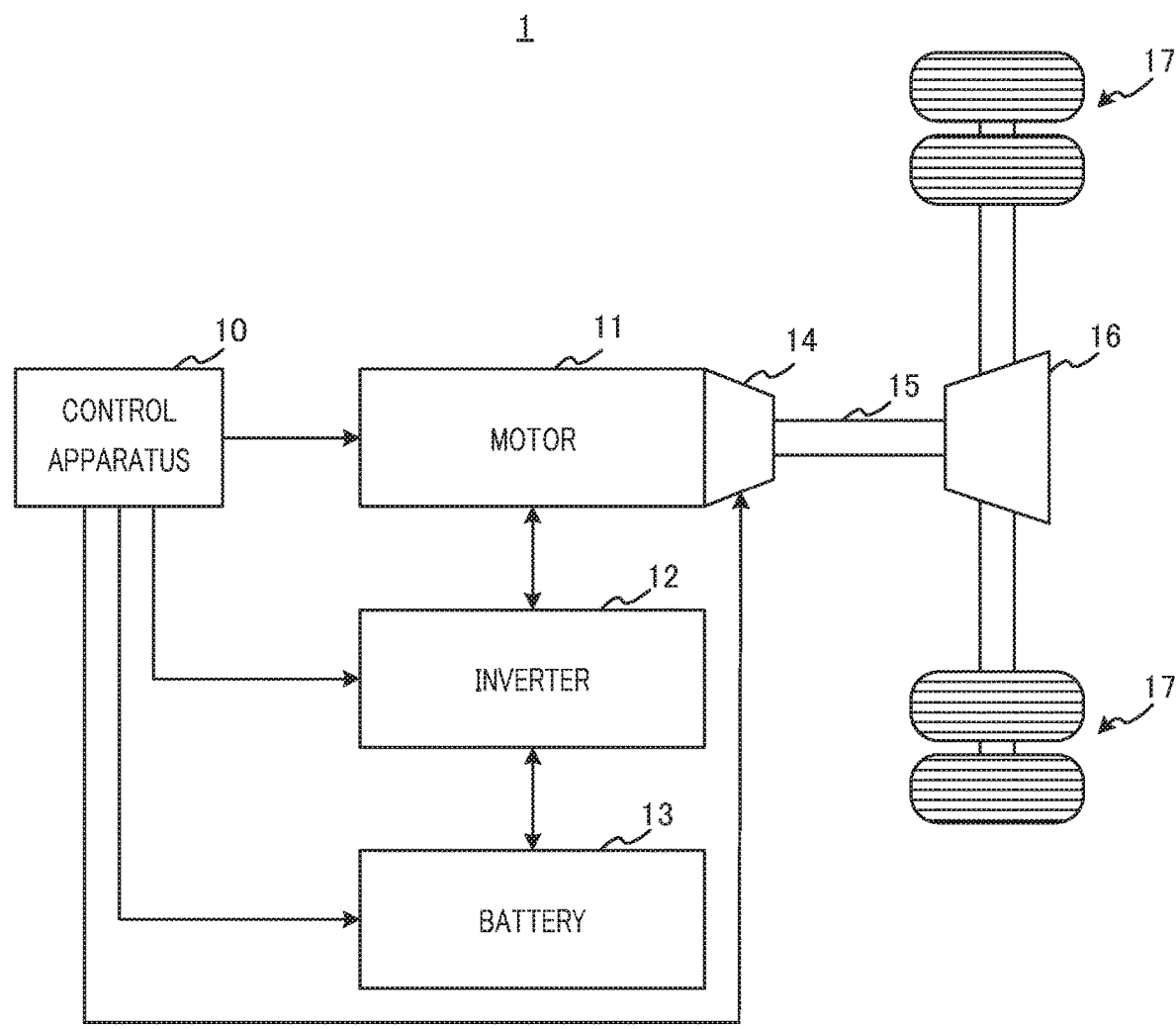
FIG. 1 shows a configuration of an electric vehicle according to an embodiment.

An embodiment of the present disclosure will be described below with reference to the accompanying drawings. FIG. 1 shows a configuration of an electric vehicle according the embodiment.

As shown in FIG. 1, electric vehicle 1 includes control apparatus 10 (which corresponds to an "electric vehicle control apparatus" of the present disclosure), motor 11, inverter 12, battery 13, transmission 14, propeller shaft 15, differential gear assembly 16, and driving wheels 17.

Control apparatus 10 controls operation of motor 11, inverter 12, battery 13, and transmission 14. Note that motor 11, inverter 12, battery 13, and transmission 14 may be controlled, for example, by ECUs (Electric Control Units) in collaboration with one another through CAN (Control Area Network) communications, with the ECUs being provided separately, but in the description of the embodiment, it is assumed that the components are controlled by single control apparatus 10.

Control apparatus 10 includes a CPU (Central Processing Unit), a ROM (Read Only Memory) storing a control program, and a working memory such as a RAM (Random Access Memory). The CPU reads the control program out of the ROM, loads the control program into the RAM and centrally controls operation of motor 11, inverter 12, battery 13, and transmission 14 in collaboration with the loaded control program.

Motor 11 rotates using electric power supplied from chargeable and dischargeable battery 13 and outputs driving torque of the electric vehicle to propeller shaft 15 via transmission 14. The driving torque outputted by motor 11 is transmitted to driving wheels 17 via propeller shaft 15 and differential gear assembly 16.

When requested by control apparatus 10 to drive motor 11, inverter 12 converts DC power of battery 13 into 3-phase AC power and supplies the AC power to motor 11. When requested by control apparatus 10 to drive motor 11, battery 13 supplies electric power to motor 11 via inverter 12.

Transmission 14, which is an automatic transmission such as an AMT (Automated Manual Transmission) or torque converter AT (Automatic Transmission), or a manual transmission, includes a transmission mechanism that connects or disconnects an output shaft of motor 11 and propeller shaft 15.

Figure 2:
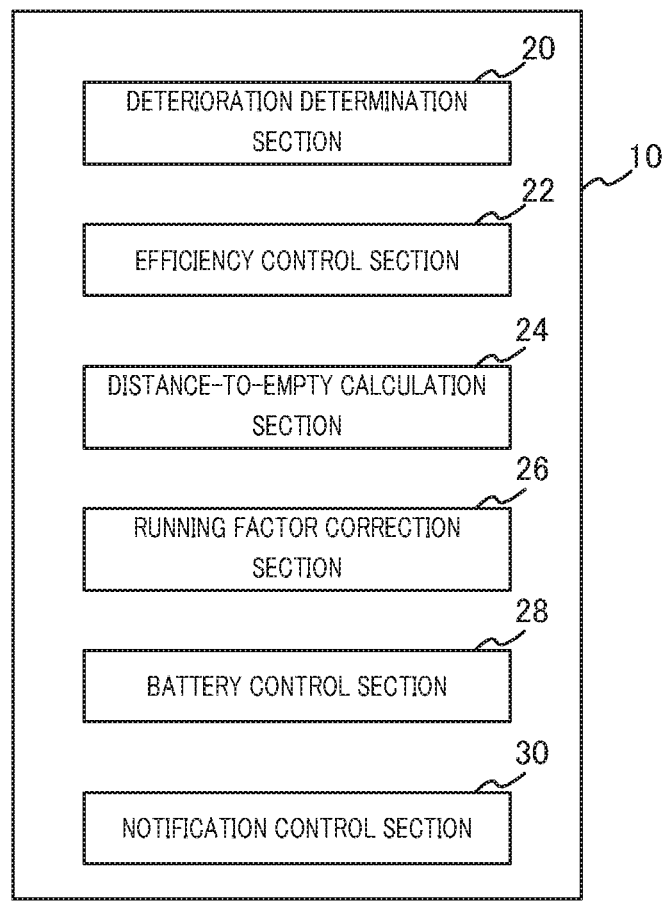
FIG. 2 is a block diagram showing a configuration made up of major functions of a control apparatus according to an embodiment.

FIG. 2 is a block diagram showing a configuration made up of major functions of control apparatus 10 according to the embodiment. As shown in FIG. 2, control apparatus 10 includes deterioration determination section 20, efficiency control section 22, distance-to-empty calculation section 24, running factor correction section 26, battery control section 28, and notification control section 30.

Figure 3:
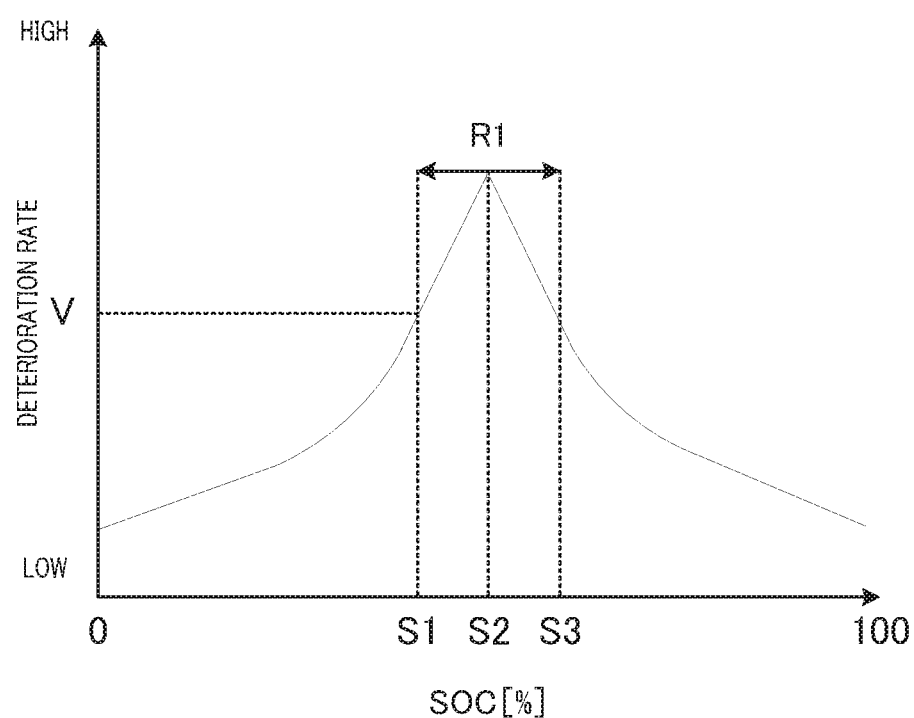
FIG. 3 shows a relationship between a SOC of a battery and a deterioration rate of the battery.

Deterioration determination section 20 determines whether battery 13 is in a state in which battery 13 is liable to deterioration. Specifically, deterioration determination section 20 determines whether a SOC of battery 13 is in predetermined range R1 (see FIG. 3) in which battery 13 is liable to deterioration. FIG. 3 shows a relationship between the SOC of battery 13 and a deterioration rate of battery 13. As shown in FIG. 3, when the SOC of battery 13 increases from zero [%] to S1 [%] and to S2 [%], the deterioration rate of battery 13 also increases, while on the other hand, when the SOC of battery 13 increases from S2 [%] to S3 [%] and to 100 [%], the deterioration rate of battery 13 decreases. Deterioration (capacity reduction due to secular changes) of battery 13 tends to progress when the SOC of battery 13 is in predetermined range R1 (S1 to S3), that is, when the deterioration rate of battery 13 is equal to or higher than predetermined rate V. In particular, when the SOC is in predetermined range R1 when electric vehicle 1 is running, deterioration of battery 13 progresses relatively quickly.

Note that to determine whether battery 13 is in a state in which battery 13 is liable to deterioration, deterioration determination section 20 may determine whether the deterioration rate of battery 13 that is determined in accordance with the value of SOC is equal to or higher than predetermined rate V (see FIG. 3).

When it is determined that electric vehicle 1 is running and it is determined by deterioration determination section 20 that battery 13 is in a state in which battery 13 is liable to deterioration, to reduce the time for which the SOC is in predetermined range R1 in which deterioration of battery 13 readily progresses, efficiency control section 22 performs control of reducing efficiency of motor 11 and thereby increases a consumption rate of electric power charged in battery 13. According to the embodiment, efficiency control section 22 reduces the efficiency of motor 11 by changing a current phase angle of motor 11 (see, for example, PTL 1).

Distance-to-empty calculation section 24 calculates the distance to empty for electric vehicle 1 using the SOC of battery 13 and a running factor (factor used for multiplication in calculating the distance to empty). That is, by multiplying the SOC of battery 13 by the running factor, distance-to-empty calculation section 24 calculates the distance to empty for electric vehicle 1. The distance to empty calculated by distance-to-empty calculation section 24 is displayed together with various information (for example, current speed of electric vehicle 1) on a display unit (not shown) installed inside electric vehicle 1.

Running factor correction section 26 corrects the running factor in such a way as to reduce changes in the distance to empty calculated by distance-to-empty calculation section 24 when the changes are compared before and after control is performed by efficiency control section 22 to reduce the efficiency of motor 11. When the running factor is not corrected, the decrease rate of the distance to empty calculated by distance-to-empty calculation section 24 increases when compared before and after control is performed by efficiency control section 22 to reduce the efficiency of motor 11. As a result, a driver might misrecognize that there is something wrong with electric vehicle 1. Even when the driver does not recognize that there is something wrong, a sudden change in the distance to empty might make the driver feel odd.

Thus, according to the embodiment, running factor correction section 26 corrects and thereby increases the running factor in such a way as to reduce changes in the distance to empty when the changes are compared before and after control is performed to reduce the efficiency of motor 11. Note that from the viewpoint of eliminating the possibility that the driver will misrecognize that there is something wrong with electric vehicle 1, desirably the running factor is corrected such that the distance to empty calculated by distance-to-empty calculation section 24 will remain unchanged when the distance to empty is compared before and after control is performed by efficiency control section 22 to reduce the efficiency of motor 11.

When control is performed by efficiency control section 22 to reduce the efficiency of motor 11, battery control section 28 decreases a lower limit of an operating range of the SOC of battery 13. This makes it possible to prevent the distance to empty based on the SOC from decreasing with increases in the decrease rate of the SOC when performing control of reducing the efficiency of motor 11.

When electric vehicle 1 is running, right after it is determined by deterioration determination section 20 that battery 13 is in a state in which battery 13 is liable to deterioration, notification control section 30 performs control of notifying that control will be performed to reduce the efficiency of motor 11. Notification control section 30, for example, lights up a lamp (warning lamp) provided on a meter panel or the like at a driver's seat and thereby notifies that control will be performed to reduce the efficiency of motor 11. Note that notification control section 30 may use a voice notification to notify that control will be performed to reduce the efficiency of motor 11.

Figure 4:
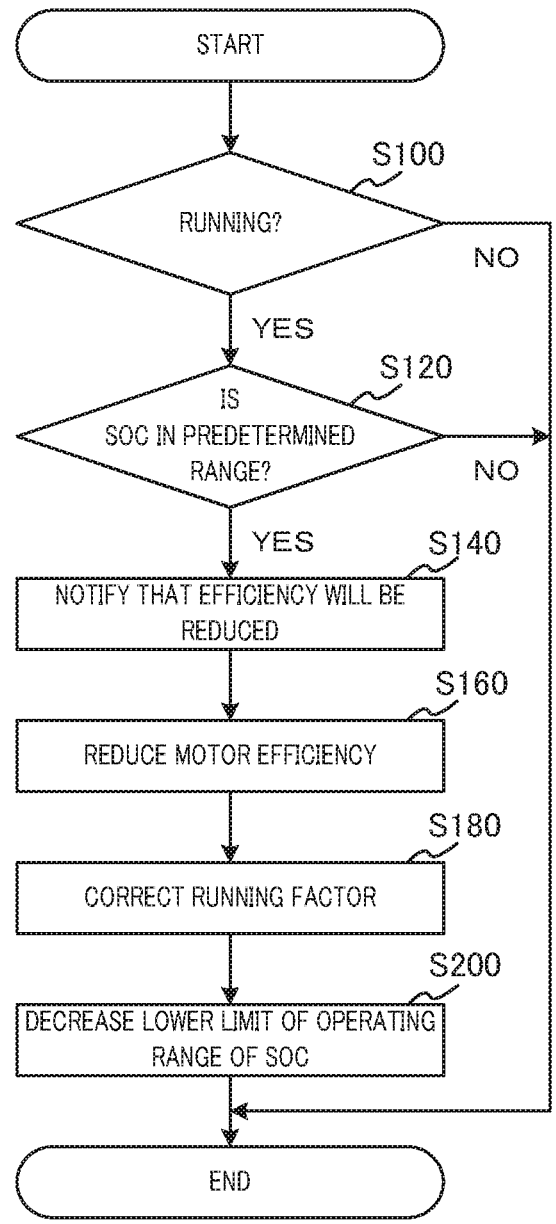
FIG. 4 is a flowchart showing an operation example of a control apparatus according to an embodiment.

Next, an operation example of control apparatus 10 according to the embodiment will be described with reference to FIG. 4.

First, control apparatus 10 determines whether electric vehicle 1 is running (step S100). When it is found as a result of determination that electric vehicle 1 is not running (NO in step S100), control apparatus 10 finishes the process of FIG. 4.

On the other hand, when electric vehicle 1 is running (YES in step S100), deterioration determination section 20 determines whether the SOC of battery 13 is in predetermined range R1 (see FIG. 3) in which battery 13 is liable to deterioration (step S120). When it is found as a result of determination that the SOC of battery 13 is not in predetermined range R1 (NO in step S120), control apparatus 10 finishes the process of FIG. 4.

On the other hand, when the SOC of battery 13 is in predetermined range R1 (YES in step S120), notification control section 30 performs control of notifying that control will be performed to reduce the efficiency of motor 11 (step S140).

Next, efficiency control section 22 performs control of reducing efficiency of motor 11 and thereby increases a consumption rate of electric power charged in battery 13 (step S160).

Next, running factor correction section 26 corrects the running factor in such a way as to reduce changes in the distance to empty calculated by distance-to-empty calculation section 24 when the changes are compared before and after control is performed by efficiency control section 22 to reduce the efficiency of motor 11 (step S180).

Finally, battery control section 28 decreases the lower limit of the operating range of the SOC of battery 13 (step S200). When the process of step S200 is completed, control apparatus 10 finishes the process of FIG. 4.

As described in detail above, according to the embodiment, control apparatus 10 includes efficiency control section 22 that performs control of reducing the efficiency of motor 11 and thereby increases the consumption rate of electric power charged in battery 13 when electric vehicle 1 is running and battery 13 is in a state in which battery 13 is liable to deterioration; distance-to-empty calculation section 24 that calculates a distance to empty for electric vehicle 1 using the SOC of battery 13 and a running factor; and running factor correction section 26 that corrects the running factor to reduce changes in the distance to empty calculated by distance-to-empty calculation section 24 when the changes are compared before and after control is performed by efficiency control section 22 to reduce efficiency of motor 11.

According to the embodiment configured as described above, in performing control of reducing efficiency of motor 11 to reduce the time for which the SOC is in predetermined range R1 in which deterioration of battery 13 readily progresses, although the decrease rate of the actual distance to empty increases with increases in the consumption rate of electric power charged in battery 13, as the running factor is corrected and thereby increased, changes in the distance to empty calculated and displayed by distance-to-empty calculation section 24 are reduced when compared before and after control is performed to reduce the efficiency of motor 11. This makes it possible to decrease the possibility that the driver will misrecognize that there is something wrong with electric vehicle 1.

It should be noted that the embodiment described above merely illustrates a concrete example of implementing the present disclosure and is not to be interpreted as limiting the technical scope of the present disclosure. That is, the present disclosure can be implemented in various forms without departing from the spirit and scope or major features of the present disclosure.

The present application is based on Japanese Patent Application No. 2017-103500, filed on May 25, 2017, which is incorporated herein by reference.

INDUSTRIAL APPLICABILITY

The present disclosure is suitable for use in an electric vehicle control apparatus and electric vehicle that can decrease the possibility that the driver will misrecognize that there is something wrong with the electric vehicle even when the consumption rate of electric power charged in a battery is increased when the electric vehicle is running.

REFERENCE SIGNS LIST

1 Electric vehicle
10 Control apparatus
11 Motor
12 Inverter
13 Battery
14 Transmission
15 Propeller shaft
16 Differential gear assembly
17 Driving wheel
20 Deterioration determination section
22 Efficiency control section
24 Distance-to-empty calculation section
26 Running factor correction section
28 Battery control section
30 Notification control section

What is claimed is:

1. An electric vehicle control apparatus that controls an electric vehicle equipped with a chargeable and dischargeable battery, an electric motor that drives a driving wheel by being supplied with electric power charged in the battery, and an inverter that converts DC power charged in the battery into AC power and applies the AC power to the motor, the electric vehicle control apparatus comprising:
   a memory configured to store a program; and
   a processor configured to execute the program to:
   perform control of reducing efficiency of the motor and thereby increases a consumption rate of the electric power charged in the battery, when the electric vehicle is running and the battery is in a state in which the battery is liable to deterioration;
   calculate a distance to empty for the electric vehicle using a state of charge (SOC) of the battery and a running factor; and
   correct the running factor in response to the control of reducing the efficiency of the motor is performed to reduce changes in the distance to empty when the changes are compared before and after the control of reducing the efficiency of the motor is performed.

2. The electric vehicle control apparatus according to claim 1, wherein the running factor is corrected such that the distance to empty remains unchanged when the distance to empty is compared before and after the control of reducing the efficiency of the motor is performed.

3. The electric vehicle control apparatus according to claim 1, wherein the state in which the battery is liable to deterioration is a state in which the SOC of the battery is in a predetermined range in which the battery is liable to deterioration.

4. The electric vehicle control apparatus according to claim 1, wherein the state in which the battery is liable to deterioration is a state in which a deterioration rate of the battery that is determined in accordance with a value of the SOC is equal to or higher than a predetermined rate.

5. The electric vehicle control apparatus according to claim 1, wherein the processor is further configured to decrease a lower limit of an operating range of the SOC of the battery when the control of reducing the efficiency of the motor is performed.

6. An electric vehicle, comprising the electric vehicle control apparatus according to claim 1.

* * * * *